United States Patent
Dumesic et al.

(10) Patent No.: US 9,688,845 B2
(45) Date of Patent: Jun. 27, 2017

(54) METHOD TO PRODUCE BIOMASS-DERIVED COMPOUNDS USING A CO-SOLVENT SYSTEM CONTAINING GAMMA-VALEROLACTONE

(71) Applicant: Wisconsin Alumni Research Foundation, Madison, WI (US)

(72) Inventors: James A. Dumesic, Verona, WI (US); Ali Hussain Motagamwala, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 9 days.

(21) Appl. No.: 14/686,086

(22) Filed: Apr. 14, 2015

(65) Prior Publication Data
US 2016/0304704 A1   Oct. 20, 2016

(51) Int. Cl.
*C08L 5/00* (2006.01)
*C08L 97/00* (2006.01)
*C13K 1/02* (2006.01)

(52) U.S. Cl.
CPC .............. *C08L 5/00* (2013.01); *C08L 97/005* (2013.01); *C13K 1/02* (2013.01)

(58) Field of Classification Search
None
See application file for complete search history.

(56) References Cited

U.S. PATENT DOCUMENTS

| | | | |
|---|---|---|---|
| 9,045,804 B2 * | 6/2015 | Dumesic | C13K 1/02 |
| 2008/0312479 A1 | 12/2008 | McCall et al. | |
| 2010/0312027 A1 | 12/2010 | Tsurutani et al. | |
| 2010/0319862 A1 | 12/2010 | Rahman | |
| 2014/0194619 A1* | 7/2014 | Dumesic | C13K 1/02 536/124 |
| 2014/0356915 A1 | 12/2014 | Retsina et al. | |

OTHER PUBLICATIONS

Alonso et al. (2013), Integrated conversion of hemicellulose and cellulose from lignocellulosic biomass, *Energy Environ. Sci.* 6:76-80.
Bardin et al. (1998), Acidity of Keggin-Type Heteropolycompounds Evaluated by Catalytic Probe Reactions, Sorption Microcalorimetry and Density Functional Quantum Chemical Calculations, *J. of Physical Chemistry B*, 102:10817-10825.
Binder & Raines (2010), Fermentable sugars by chemical hydrolysis of biomass, *Proc. Natl. Acad. Sci. U.S.A.* 107:4516-4521.
(Continued)

*Primary Examiner* — Melvin C Mayes
*Assistant Examiner* — Stefanie Cohen
(74) *Attorney, Agent, or Firm* — Joseph T. Leone, Esq.; DeWitt Ross & Stevens S.C.

(57) ABSTRACT

A method to produce an aqueous solution of carbohydrates containing C5- and/or C6-sugar-containing oligomers and/or C5- and/or C6-sugar monomers in which biomass or a biomass-derived reactant is reacted with a solvent system having an organic solvent, and organic co-solvent, and water, in the presence of an acid. The method produces the desired product, while a substantial portion of any lignin present in the reactant appears as a precipitate in the product mixture.

31 Claims, 1 Drawing Sheet

Schematic diagram of the reactor setup.

(56) References Cited

OTHER PUBLICATIONS

Bobleter (1994), Hydrothermal Degradation of Polymers Derived From Plants, *Prog. Polym. Sci.* 19:797-841.
Gürbüz et al. (2013), Conversion of Hemicellulose into Furfural Using Solid Acid Catalysts in γ-Valerolactone, *Angew. Chem. Int. Ed.* 52:1270-1274.
Lee et al. in Recent Progress in Bioconversion of Lignocellulosics, Chapter 10 (Dilute-Acid Hydrolysis of Lignocellulosic Biomass), pp. 93-115, © 1999 Springer-Verlag Press, Berlin, Germany, ISBN: 978-3-540-65577-0.
Liu & Wyman (2004), The Effect of Flow Rate of Very Dilute Sulfuric Acid on Xylan, Lignin, and total Mass Removal from Corn Stover, *Ind. Eng. Chem. Res.* 43:2781-2788.
Maclean & Spatari (2009), The contribution of enzymes and process chemicals to the life cycle of ethanol, *Environ. Res. Lett.* 4(1):014001.
Peterson et al. (2008), Thermochemical biofuel production in the hydrothermal media: A review of sub- and supercritical water technologies, *Energy Environ. Sci.* 1:32-65.
Shill et al (2011), Ionic Liquid Pretreatment of Cellulosic Biomass: Enzymatic Hydrolysis and Ionic Liquid Recycle, *Biotechnology and Bioengineering* 108, 511-520.
Von Sivers & Zacchi (1995), A Techno-Economical Comparison of Three Processes for the Production of Ethanol From Pine, *Bioresour. Technol.* 51:43-52.
Wettstein et al. (2012), Production of levulinic acid and gamma-valerolactones (GVL) from cellulose using GVL as a solvent in biphasic systems, *Energy Environ. Sci.* 5:8199-8203.
Wilson (2009), Cellulases and biofuels, *Curr. Opin. Biotechnol.* 20(3):295-299.

\* cited by examiner

Schematic diagram of the reactor setup.

METHOD TO PRODUCE BIOMASS-DERIVED COMPOUNDS USING A CO-SOLVENT SYSTEM CONTAINING GAMMA-VALEROLACTONE

FEDERAL FUNDING STATEMENT

This invention was made with government support under DE-FC02-07ER64494 awarded by the US Department of Energy. The government has certain rights in the invention.

BACKGROUND

Successful carbohydrate recovery from lignocellulosic biomass requires breaking intermolecular bonds in glucan and xylan chains while avoiding further reaction of the resulting glucose and xylose. However, in neutral or dilute aqueous acid solutions (<10 wt % mineral acid systems), the resulting glucose further reacts to yield furans or other degradation products. The glucose degradation reactions significantly outpace cellulose depolymerization at temperatures below 250-350° C. depending on the acid content. This leads to the need for reaction systems with short residence times (10 ms to 1 min) at high temperatures (250-400° C.) in order to obtain a high selectivity to glucose at high conversion, while simultaneously minimizing degradation of the desired glucose product. See Bobleter (1994) *Prog. Polym. Sci.* 19:797-841 and Peterson et al. (2008) *Energy Environ. Sci.* 1:32-65. These types of short-residence-time reactions are especially impractical when using heterogeneous starting products such as biomass. Higher yields are obtainable at lower temperatures and longer residence times using increased homogeneous catalyst concentrations such as high mineral acid concentrations and/or ionic liquids. However, in both cases, the homogeneous catalyst and ionic liquid are a significant expense. Thus, recovering the catalyst and/or ionic liquid is critical for the commercial viability of these processes. Ultimately, recovering and recycling these materials end up being a significant component of the processing costs. See, for example, Von Sivers & Zacchi (1995) *Bioresour. Technol.* 51:43-52; Binder & Raines (2010) *Proc. Natl. Acad. Sci. U.S.A.* 107:4516-4521 (2010); and Shill et al (2011) *Biotechnology and Bioengineering* 108, 511-520 (2011).

Cellulase enzymes operating at only 50° C. can achieve near complete conversion of cellulose. However, in these processes, the cellulose must be rendered accessible by a thermochemical pretreatment of the raw cellulosic feed stock. Both enzyme and pretreatment costs are significant obstacles toward the successful commercialization of these processes. For example, enzyme costs are consistently shown to account for between US $0.50 and $2.00 per gallon of ethanol (2009 dollars). This expense is a significant portion of the overall cost of production. See, for example, MacLean & Spatari (2009) *Environ. Res. Lett.* 4(1):014001 and Wilson (2009) *Curr. Opin. Biotechnol.* 20(3):295-299.

Strategies have been developed to produce glucose and xylose from biomass while avoiding further degradation despite using low catalyst concentration and low temperature. One such strategy involves passing a solvent through a heated packed bed of biomass in a flow-through reaction system. This approach decouples the residence times of the solid carbohydrate polymer from its soluble counterpart. These systems are typically limited by their ability to produce reasonably concentrated product solutions. Indeed, using an aqueous solution of 1 wt % $H_2SO_4$ as the extraction solvent, glucose yields of only 45-55% can be achieved when using a 2-4 wt % sugar solution as the feedstock. See Lee et al. in "Recent Progress in Bioconversion of Lignocellulosics," Chapter 10 (Dilute-Acid Hydrolysis of Lignocellulosic Biomass), pp. 93-115, © 1999 Springer-Verlag Press, Berlin, Germany, ISBN: 978-3-540-65577-0; and Liu & Wyman (2004) *Ind. Eng. Chem. Res.* 43:2781-2788.

In recent work, GVL-water solutions coupled with very dilute acid concentrations (>0.1 M $H_2SO_4$) or solid acid catalysts have shown the ability to solubilize lignocellulosic biomass and promote dehydration of glucose to levulinic acid and of xylose to furfural. See Gürbüz et al. (2013) *Angew. Chem. Int. Ed.* 52:1270-1274; Alonso et al. (2013) *Energy Environ. Sci.* 6:76-80; and Wettstein et al. (2012) *Energy Environ. Sci.* 5:8199-8203.

Published U.S. Pat. Appl. US 2014/0 194 619, to Dumesic et al., published Jul. 10, 2014, describes a process to produce an aqueous solution of carbohydrates (C5- and C6-sugar monomers and oligomers) from biomass by reacting the biomass with a solvent system comprising a beta-, gamma-, or delta-lactone and at least 1 wt % water, in the presence of an acid catalyst. This process results in a product mixture containing water-soluble C6-sugar-containing oligomers, C6-sugar monomers, C5-sugar-containing oligomers, and/or C5-sugar monomers. A solute is added to the reaction mixture in an amount sufficient to cause partitioning of the mixture into an aqueous layer and a substantially immiscible organic layer. This process, while effective, is not necessarily economically efficient. For example, the lactone solvent (typically gamma-valerolactone, GVL) must be recycled for the process to be economically feasible. This separation can be done very efficiently using liquid carbon dioxide. However, extracting with liquid carbon dioxide requires high-pressure equipment—an added capital expense. Additionally, the lignin present in the raw biomass is solubilized and retained in the $CO_2$-expanded lactone phase. Thus, the lactone solvent must be recovered from the lignin. This recovery requires evaporating the relatively high boiling point lactone from the lignin. The resulting lignin fraction is recalcitrant to any further processing. It is typically sold as low-value fuel.

Thus, there remains a long-felt and unmet need for an economically efficient process to produce C6-sugar-containing oligomers, C6-sugar monomers, C5-sugar-containing oligomers, C5-sugar monomers, and/or other dehydration products from biomass and/or a biomass-derived reactant.

SUMMARY OF THE INVENTION

Disclosed and claimed herein is a method to produce an aqueous solution of carbohydrates comprising C6-sugar-containing oligomers, C6-sugar monomers, C5-sugar-containing oligomers, C5-sugar monomers, or any combination thereof. The method includes the steps of reacting biomass or a biomass-derived reactant with a solvent system comprising
 (i) an organic solvent selected from the group consisting of a polar aprotic solvent, such as cyclic ethers (tetrahydrofurans, tetrahydropyrans), beta-, gamma-, and delta-lactones, and combinations thereof,
 (ii) an organic co-solvent, and
 (iii) water.

The reaction takes place in the presence of an acid, and for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof. Additionally, a significant fraction of lignin (e.g., at least 10% of the lignin, or at least 20%, or at least 30%, or at least 40% of the lignin), if present in the biomass or biomass-derived reactant, is present in the product mixture as a precipitate.

In another version, the method produces an aqueous solution of carbohydrates comprising C6-sugar-containing oligomers, C6-sugar monomers, C5-sugar-containing oligomers, C5-sugar monomers, or any combination thereof, by reacting biomass or a biomass-derived reactant with a solvent system comprising
(i) an organic solvent selected from the group consisting of polar aprotic solvents,
(ii) an organic co-solvent, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof, and wherein the solvent system is monophasic at the temperature of the reaction and biphasic at a lower temperature.

It is generally preferred, but not required, that the solvent system is monophasic at temperature ranges selected from the group consisting of about 100° C. to about 300° C., about 140° C. to about 240° C., and about 150° C. to about 225° C., and is biphasic at temperatures below about 50° C. Also preferred, but not required, is that at least 10% of the lignin, or at least 20%, or at least 30%, or at least 40% of the lignin, if present in the biomass or biomass-derived reactant, is present in the product mixture as a precipitate.

In one version of the method, the organic solvent is miscible with water at 20° C. The organic solvent may be gamma-valerolactone (GVL). The organic co-solvent may optionally be selected from the group consisting of linear, branched or cyclic alkanes; linear, branched or cyclic alkenes; linear, branched or cyclic ketones; linear, branched or cyclic alcohols; aromatic hydrocarbons; and substituted or unsubstituted phenols. In one version of the method, the organic solvent is gamma-valerolactone (GVL) and the organic co-solvent is an aromatic hydrocarbon.

In all versions of the method, the organic solvent may be present in a mass ratio with the water (i.e., the organic solvent:water ratio) selected from the group consisting of about 50:50, about 55:45, about 60:40, about 65:35, about 70:30, about 75:25, about 80:20, about 85:15, about 90:10, about 95:5, about 97:3, about 98:2, and about 99:1. Similarly, in all versions of the method, the organic co-solvent may be present in a volume ratio with the solvent system (i.e., the organic co-solvent:solvent ratio) selected from the group consisting of about 5:50, about 10:50, about 10:40, and about 10:30.

In all versions of the method, the acid may be homogeneous or heterogeneous, and if the acid is homogeneous it may be present in a concentration not greater than 100 mM based on volume of the solvent system, and if the acid is heterogeneous it may be present in a concentration not greater than 1.0 wt % based on weight of the solvent system. The acid may be a mineral acid or an organic acid. For example, the acid may be a solid acid selected from the group consisting of a solid Brønsted acid, a solid Lewis acid catalysts, and combinations thereof. Or the solid acid may be a heteropolyacid. The solid acid may also be an amorphous or mesoporous silica, which may be unfunctionalized or functionalized with acidic modifier. The solid acid could also be a zeolite.

The method may be carried out at any desired temperature. To maximize yield and to balance time considerations, it is generally preferred that the biomass or a biomass-derived reactant is reacted at a temperature range selected from the group consisting of from about 100° C. to about 300° C., about 140° C. to about 240° C., and about 150° C. to about 225° C. The reaction temperature may be fixed or ramped or discontinuous or otherwise dynamic. The dynamic temperature range may optionally ramp from a first temperature to a second temperature that is higher than the first temperature or vice-versa.

Any biomass or biomass-derived reactant may be used in the method, without limitation. It is generally preferred, however, that the biomass or a biomass-derived reactant comprises water-insoluble glucose-containing polymers or oligomers, or water-insoluble xylose-containing polymers or oligomers, or any combination thereof, and these, if present, are converted to water-soluble glucose-containing oligomers, glucose monomers, water-soluble xylose-containing oligomers, xylose monomers, or any combination thereof.

There a no specific time constraints in the method. Residence times of the reaction in the reactor, however, may be selected from the group consisting of 1 min to 24 hours, 1 min to 20 hours, 1 min to 12 hours, 1 min to 6 hours, 1 min to 3 hours, 1 min to 2 hours, 1 min to 1 hour, and 1 min to 30 min.

It is generally preferred, but not required, that the solvent system selected is monophasic at the temperature of the reaction and biphasic below the reaction temperature, e.g., biphasic at room temperature (about 20° C.).

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the claimed method shall include the corresponding plural characteristic or limitation, and vice-versa, unless otherwise specified or clearly implied to the contrary by the context in which the reference is made.

All combinations of method or process steps as disclosed and claimed herein can be performed in any order, unless otherwise specified or clearly implied to the contrary by the context in which the referenced combination is made.

The methods disclosed and claimed herein can comprise, consist of, or consist essentially of the elements and limitations of the method disclosed herein, as well as any additional or optional ingredients, components, or limitations described herein or otherwise useful in the processing of biomass to yield value-added chemicals.

BRIEF DESCRIPTION OF THE DRAWING

The sole drawing FIGURE is a schematic diagram of the reactor setup used to solubilize and fractionate biomass as described in the examples herein.

DETAILED DESCRIPTION

Abbreviations and Definitions:

"Biomass" as used herein includes materials containing cellulose, hemicellulose, lignin, protein and carbohydrates such as starch and sugar. Common forms of biomass include trees, shrubs and grasses, corn and corn husks as well as municipal solid waste, waste paper and yard waste. Biomass high in starch, sugar or protein such as corn, grains, fruits and vegetables, is usually consumed as food. Conversely, biomass high in cellulose, hemicellulose and lignin is not readily digestible by humans and is primarily utilized for wood and paper products, fuel, or is discarded as waste. "Biomass" as used herein explicitly includes branches, bushes, canes, corn and corn husks, energy crops, forests, fruits, flowers, grains, grasses, herbaceous crops, leaves, bark, needles, logs, roots, saplings, short rotation woody crops, shrubs, switch grasses, trees, vegetables, vines, hard and soft woods. In addition, biomass includes organic waste materials generated from agricultural processes including farming and forestry activities, specifically including forestry wood waste. "Biomass" includes virgin biomass and/or non-virgin biomass such as agricultural biomass, commercial organics, construction and demolition debris, municipal solid waste, waste paper, and yard waste. Municipal solid waste generally includes garbage, trash, rubbish, refuse and offal that is normally disposed of by the occupants of residential dwelling units and by business, industrial and commercial establishments, including but not limited to: paper and cardboard, plastics, food scraps, scrap wood, saw dust, and the like.

"Biomass-derived"=Compounds or compositions fabricated or purified from biomass.

Brønsted-Lowry Acid/Base=A Brønsted-Lowry acid is defined herein as any chemical species (atom, ion, molecule, compound, complex, etc.), without limitation, that can donate or transfer one or more protons to another chemical species. Mono-protic, diprotic, and triprotic acids are explicitly included within the definition. A Brønsted-Lowry base is defined herein as any chemical species that can accept a proton from another chemical species. Included among Brønsted-Lowry acids are mineral acids, organic acids, heteropolyacids, solid acid catalysts, zeolites, etc. as defined herein. Note that this list is exemplary, not exclusive. The shortened term "Brønsted" is also used synonymously with "Brønsted-Lowry."

"Carbohydrate" is defined herein as a compound that consists only of carbon, hydrogen, and oxygen atoms, in any ratio.

"$C_5$ carbohydrate" refers to any carbohydrate, without limitation, that has five (5) carbon atoms. The definition includes pentose sugars of any description and stereoisomerism (e.g., D/L aldopentoses and D/L ketopentoses). $C_5$ carbohydrates include (by way of example and not limitation) arabinose, lyxose, ribose, ribulose, xylose, and xylulose.

"$C_6$ carbohydrate" refers to any carbohydrate, without limitation, that has six (6) carbon atoms. The definition includes hexose sugars of any description and stereoisomerism (e.g., D/L aldohexoses and D/L ketohexoses). $C_6$ carbohydrates include (by way of example and not limitation) allose, altrose, fructose, galactose, glucose, gulose, idose, mannose, psicose, sorbose, tagatose, and talose.

"Cellulose" refers to a polysaccharide of glucose monomers (($C_6H_{10}O_5)_n$); "cellulosic biomass" refers to biomass as described earlier that comprises cellulose, and/or consists essentially of cellulose, and/or consists entirely of cellulose.

Lignocellulosic biomass refers to biomass comprising cellulose, hemicellulose, and lignin. Lignocellulosic biomass comprises xylose, as does hemicellulose. For the experiments described below, dried corn stover was obtained through the Great Lakes Bioenergy Research Center, Madison, Wis., USA.

"Cyclic ether" refers to any compound containing a C—O—C moiety in a ring, excluding the furans defined in the immediately preceding paragraph. Examples include tetrahydrofuran, methyltetrahydrofuran, tetrahydropyran, methyltetrahydropyran, 1,4-dioxane, and the like.

"Furans" refers to compounds comprising a five-membered aromatic ring with four carbon atoms and one oxygen; that is, any species containing a furan ring, including furan itself, dimethyl furan, etc. Those furans that can dissolve at least about 1 wt % water, and more preferably at least about 5 wt % (or more) of water (up to miscible) are preferred for use in the process described herein.

"Glucose-containing oligomers, glucose-containing polymers, Glucose-containing reactant, C6-containing reactant"=Any chemical species, having any type of intramolecular bond type, that comprises a glucose or other C6 sugar unit. The definition explicitly includes glucose-containing disaccharides (such as, but not limited to, sucrose, lactose, maltose, trehalose, cellobiose, kojibiose, nigerose, isomaltose, β,β-trehalose, α,β-trehalose, sophorose, laminaribiose, gentiobiose, turanose, maltulose, palatinose, gentiobiulose, etc.), trisaccharides (such as, but not limited to, isomaltotriose, nigerotriose, maltotriose, maltotriulose, raffinose, etc.), and larger oligosaccharides and polysaccharides, as well as large and more complex glucose-containing polymers and carbohydrates and other polymers and carbohydrates containing C6 sugar units, such as, but not limited to, starch, amylase, amylopectin, glycogen, cellulose, hemicelluloses (e.g., xyloglucan, glucomannan, etc.), lignocellulose, and the like. Linear, branched, and macrocyclic oligomers and polymers containing glucose, including those found in biomass, are explicitly included within the definition. Likewise, "xylose-containing oligomers, xylose-containing polymers, xylose-containing reactant, C5-containing reactant"=Any chemical species, having any type of intramolecular bond type, that comprises a xylose or other C5 sugar unit.

"GVL"=gamma-valerolactone (γ-valerolactone). "HMF"=5-hydroxymethylfufural. "HPLC"=high-performance liquid chromatography.

"Heteropolyacid"=A class of solid-phase acids exemplified by such species as $H_4SiW_{12}O_{40}$, $H_3PW_{12}O_{40}$, $H_6P_2W_{18}O_{62}$, $H_{3+x}PMo_{12-x}V_xO_{40}$ and the like. Heteropolyacids are solid-phase acids having a well-defined local structure, the most common of which is the tungsten-based Keggin structure. The Keggin unit comprises a central $PO_4$ tetrahedron, surrounded by 12 $WO_6$ octahedra. The standard unit has a net (−3) charge, and thus requires three cations to satisfy electroneutrality. If the cations are protons, the material functions as a Brønsted acid. The acidity of these compounds (as well as other physical characteristics) can be "tuned" by substituting different metals in place of tungsten in the Keggin structure. See, for example, Bardin et al. (1998) "Acidity of Keggin-Type Heteropolycompounds Evaluated by Catalytic Probe Reactions, Sorption Microcalorimetry and Density Functional Quantum Chemical Calculations," *J. of Physical Chemistry B*, 102:10817-10825.

"Hydrofuran" is used herein to refer to any unsubstituted or substituted cyclic ether having a single oxygen heteroatom in the ring, and having five total atoms in the ring and which is derived from furanic compounds.

"Hydropyran" is used herein to refer to any unsubstituted or substituted cyclic ether having a single oxygen heteroatom in the ring, and having six total atoms in the ring and which is derived from pyranic compounds.

"Lactone" as used herein refers to an unsubstituted or substituted cyclic ester, having a single oxygen heteroatom in the ring, and having from four to six total atoms in the ring—i.e., beta, gamma, and delta lactones, derived from any corresponding C4 to C16 carboxylic acid. Thus, as used herein, the term "lactone" explicitly includes (without limitation) unsubstituted and substituted beta- and gamma-butyrolactone and beta-, gamma-, and delta-valerolactones to beta-, gamma-, and delta-hexadecalactones. Some lactones are miscible in water, such as GVL; other lactones have more limited solubility in water. Those lactones that can dissolve at least about 1 wt % water, and more preferably at least about 5 wt % (or more) of water (up to miscible) are suitable for use in the process described herein. Gamma- and delta-lactones are preferred. Gamma-valerolactone is most preferred.

"Mineral acid"=any mineral-containing acid, including (by way of example and not limitation), hydrochloric acid, nitric acid, phosphoric acid, sulfuric acid, boric acid, hydrofluoric acid, hydrobromic acid, and the like.

"Organic acid"=any organic acid, without limitation, such as toluenesulfonic acid, formic acid, acetic acid, trifluoroacetic acid, oxalic acid, and the like.

"Lewis Acid/Base"=A Lewis acid is defined herein as any chemical species that is an electron-pair acceptor, i.e., any chemical species that is capable of receiving an electron pair, without limitation. A Lewis base is defined herein as any chemical species that is an electron-pair donor, that is, any chemical species that is capable of donating an electron pair, without limitation.

The Lewis acid (also referred to as the Lewis acid catalyst) may be any Lewis acid based on transition metals, lanthanoid metals, and metals from Group 4, 5, 13, 14 and 15 of the periodic table of the elements, including boron, aluminum, gallium, indium, titanium, zirconium, tin, vanadium, arsenic, antimony, bismuth, lanthanum, dysprosium, and ytterbium. One skilled in the art will recognize that some elements are better suited in the practice of the method. Illustrative examples include $AlCl_3$, $(alkyl)AlCl_2$, $(C_2H_5)_2AlCl$, $(C_2H_5)_3Al_2Cl_3$, $BF_3$, $SnCl_4$ and $TiCl_4$.

The Group 4, 5 and 14 Lewis acids generally are designated by the formula $MX_4$; wherein M is Group 4, 5, or 14 metal, and X is a halogen independently selected from the group consisting of fluorine, chlorine, bromine, and iodine, preferably chlorine. X may also be a psuedohalogen. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in the method may also have the general formula $MR_nX_{4-n}$; wherein M is Group 4, 5, or 14 metal; wherein R is a monovalent hydrocarbon radical selected from the group consisting of $C_1$ to $C_{12}$ alkyl, aryl, arylalkyl, alkylaryl and cycloalkyl radicals; wherein n is an integer from 0 to 4; and wherein X is a halogen independently selected from the group consisting of fluorine, chlorine, bromine, and iodine, preferably chlorine. X may also be a psuedohalogen. Non-limiting examples include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in method may also have the general formula $M(RO)_nR'_mX_{(m+n)}$; wherein M is Group 4, 5, or 14 metal; RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals; n is an integer from 0 to 4; m is an integer from 0 to 4 such that the sum of n and m is not more than 4; and X is a halogen independently selected from the group consisting of fluorine, chlorine, bromine, and iodine, preferably chlorine. X may also be a psuedohalogen. Non-limiting examples include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 5 Lewis acids may also have the general formula $MOX_3$; wherein M is a Group 5 metal; X is a halogen independently selected from the group consisting of fluorine, chlorine, bromine, and iodine, preferably chlorine. A non-limiting example is vanadium oxytrichloride.

The Group 13 Lewis acids have the general formula $MX_3$; wherein M is a Group 13 metal and X is a halogen independently selected from the group consisting of fluorine, chlorine, bromine, and iodine, preferably chlorine. X may also be a psuedohalogen. Non-limiting examples include aluminum trichloride, boron trifluoride, gallium trichloride, indium trifluoride, and the like.

The Group 13 Lewis acids useful in method may also have the general formula: $MR_nX_{3-n}$ wherein M is a Group 13 metal; R is a monovalent hydrocarbon radical selected from the group consisting of $C_1$ to $C_{12}$ alkyl, aryl, arylalkyl, alkylaryl and cycloalkyl radicals; and n is an number from 0 to 3; and X is a halogen independently selected from the group consisting of fluorine, chlorine, bromine, and iodine, preferably chlorine. X may also be a psuedohalogen. Non-limiting examples include ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum and triethylaluminum.

Group 13 Lewis acids useful in this disclosure may also have the general formula $M(RO)_nR'_mX_{3-(m+n)}$; wherein M is a Group 13 metal; RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals; n is a number from 0 to 3; m is an number from 0 to 3 such that the sum of n and m is not more than 3; and X is a halogen independently selected from the group consisting of fluorine, chlorine, bromine, and iodine, preferably chlorine. X may also be a psuedohalogen. Non-limiting examples include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Group 13 Lewis acids useful in this disclosure may also have the general formula $M(RC(O)O)_nR'_mX_{3-(m+n)}$; wherein M is a Group 13 metal; RC(O)O is a monovalent hydrocarbacyl radical selected from the group consisting of $C_2$ to $C_{30}$ alkacyloxy, arylacyloxy, arylalkylacyloxy, alkylarylacyloxy radicals; R' is a monovalent hydrocarbon radical selected from the group consisting of $C_1$ to $C_{12}$ alkyl, aryl, arylalkyl, alkylaryl and cycloalkyl radicals; n is a number from 0 to 3 and m is a number from 0 to 3 such that the sum of n and m is not more than 3; and X is a halogen independently selected from the group consisting of fluorine, chlorine, bromine, and iodine, preferably chlorine. X may also be a psuedohalogen. Non-limiting examples include acetoxyaluminum dichloride, benzoyloxyaluminum dibromide, benzoyloxygallium difluoride, methyl acetoxyaluminum chloride, and isopropoyloxyindium trichloride.

The most preferred Lewis acids for use in the method are metal halides generally and more specifically transition metal halides, lanthanoid metal halides, and Group 5, 13, and 14 metal halides. Preferred among the metal halides are metal chlorides. Preferred transition metal chlorides include, but are not limited to, $TiCl_4$, $VCl_3$. and the like. Preferred Group 13 and 14 metal halides and chlorides include, but are not limited to, $BF_3$, $AlCl_3$, $SnCl_4$, $InCl_3$, and $GaCl_3$. Preferred lanthanoid chlorides include, but are not limited to, $LaCl_3$, $DyCl_3$ and $YbCl_3$.

The terms "solid acid" and "solid acid catalyst" are used synonymously herein and can comprise one or more solid acid materials. The solid acid catalyst can be used independently or alternatively can be utilized in combination with one or more mineral acid or other types of catalysts. Exemplary solid acid catalysts which can be utilized include, but are not limited to, heteropolyacids, acid resin-type catalysts, mesoporous silicas, acid clays, sulfated zirconia, molecular sieve materials, zeolites, and acidic material on a thermo-stable support. Where an acidic material is provided on a thermo-stable support, the thermo-stable support can include for example, one or more of silica, tin oxide, niobia, zirconia, titania, carbon, alpha-alumina, and the like. The oxides themselves (e.g., $ZrO_2$, $SnO_2$, $TiO_2$, etc.) which may optionally be doped with additional acid groups such as $SO_4^{2-}$ or $SO_3H$ may also be used as solid acid catalysts.

Further examples of solid acid catalysts include strongly acidic ion exchangers such as cross-linked polystyrene containing sulfonic acid groups. For example, the Amberlyst®-brand resins are functionalized styrene-divinylbenzene copolymers with different surface properties and porosities. (These types of resins are designated herein as "Amb" resins, followed by a numeric identifier of the specific sub-type of resin where appropriate.) The functional group is generally of the sulfonic acid type. The Amberlyst®-brand resins are supplied as gellular or macro-reticular spherical beads. (Amberlyst® is a registered trademark of the Dow Chemical Co.) Similarly, Nafion®-brand resins are sulfonated tetrafluoroethylene-based fluoropolymer-copolymers which are solid acid catalysts. Nafion® is a registered trademark of E.I. du Pont de Nemours & Co.

Solid catalysts can be in any shape or form now known or developed in the future, such as, but not limited to, granules, powder, beads, pills, pellets, flakes, cylinders, spheres, or other shapes.

Zeolites may also be used as solid acid catalysts. Of these, H-type zeolites are generally preferred, for example zeolites in the mordenite group or fine-pored zeolites such as zeolites X, Y and L, e.g., mordenite, erionite, chabazite, or faujasite. Also suitable are ultrastable zeolites in the faujasite group which have been dealuminated.

The Method:

Disclosed herein is a method to produce an aqueous solution of carbohydrates comprising C6-sugar-containing oligomers, C6-sugar monomers, C5-sugar-containing oligomers, C5-sugar monomers, or any combination thereof. The method uses a solvent system comprising (i) an organic solvent selected from the group consisting of beta-, gamma-, and delta-lactones, and combinations thereof, (ii) an organic co-solvent, and (iii) water. The reaction mixture also includes an acid, which generally functions as a catalyst to deconstruct/dehydrate the biomass. Thus, the method is conducted in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof. Of particular note is that the present method results in a significant portion of any lignin present in the reactant to be rendered insoluble in the solvent system. Thus, in the product mixture, a significant portion of the lignin present in the reactant (at least 30%) is present in the product mixture as a precipitate.

Another benefit of the method is that if the components of the solvent system are chosen judiciously, the solvent system is monophasic at the temperatures at which the reaction takes place (generally 100° C. to about 300° C., although temperatures above and below this range are within the scope of the attached claims) and biphasic below the reaction temperature. That is, at the reaction temperature, the components of the solvent system are either miscible in each other, or have sufficiently high solubilities in each other to yield a monophasic solvent system. Upon cooling, however, the solubilities decrease and the product mixture spontaneously partitions into an aqueous phase and an organic phase, with a substantial portion of the lignin (if any is present in the reactant) being present as a precipitate. The spontaneous partitioning of the reaction solvent at room temperature, coupled with the lignin being rendered insoluble, vastly simplifies post-reaction processing and purification of the desired products.

The preferred organic solvents for use in the method are beta-, gamma-, and delta-lactones. The most preferable of these is GVL.

The organic co-solvent can be selected from a wide array of known solvents, as shown in Table 1. As a general proposition, the co-solvent is selected empirically based on the nature of the reactants being treated and the desired product mix. The co-solvent should, however, satisfy the following criteria. First, the co-solvent should not negatively affect the selectivity of the reaction towards sugar formation. Second, and as noted above, the co-solvent should preferably form two separate phases below the reaction temperature: a first organic phase rich in GVL and co-solvent and second aqueous phase rich in sugar and water. Note that this second criterion is simply preferred, but not required. Third, the chosen co-solvent should render a substantial portion of the lignin present in the reactant insoluble in both the organic phase and the aqueous phase of the product mix.

Table 1 provides a comparison of various co-solvents, and provides information on whether the co-solvent is miscible with GVL/water at 180° C. and whether the co-solvent spontaneously partitions into two phases (aqueous and organic phases) at ambient temperature (e.g., about 20° C.). The data presented in Table 1 are exemplary, and not exclusive. Other solvents may also be used in the recited method.

TABLE 1

Comparison of Organic Co-Solvents

| Compound Class | Co-Solvent | Separation at 20° C. | Miscible (at 180° C.) |
|---|---|---|---|
| Linear alkenes | 1-Hexene | ✓ | ✓ |
| Linear ketones | 2-Pentanone | ✓ | x |
| | 3-Octanone | ✓ | ✓ |
| Linear alcohols | 1-Octanol | ✓ | ✓ |
| Cyclic alkanes | Methylcyclopentane | ✓ | x |
| | Cyclohexane | ✓ | x |
| | Cyclopentane | ✓ | ✓ |
| Cyclic ketones | Cyclohexanone | ✓ | x |
| Cyclic alkenes | Cyclohexene | ✓ | ✓ |
| Aromatic hydrocarbons/ Arenes | O-xylene | ✓ | ✓ |
| | Toluene | ✓ | ✓ |
| | Benzene | ✓ | ✓ |
| | Ethyl-benzene | ✓ | ✓ |
| Phenolics | M-cresol | ✓ | x |
| | Phenol | ✓ | ✓ |

The ability of the solvent system to partition spontaneously at lower temperatures, yet be monophasic at the elevated reaction temperatures, can be controlled by varying the relative concentrations of the organic solvent, the organic co-solvent, and the water in the solvent system, as shown in Table 2. In Table 2, the solvent system consists of GVL as the organic solvent, benzene as the organic co-solvent, and water. As shown in the table, a solvent system that is 70:10:20 (GVL:benzene:water, by weight) partitions into two phases at temperatures ranging from about 20° C. to about 140° C. At temperatures above 140° C., the individual components of the solvent system become miscible in each other, and the solvent system becomes monophasic. The 60:20:20 (GVL:benzene:water, by weight) solvent system displays similar behavior, but partitions into two phases at temperatures ranging from about 20° C. to about 160° C. The 50:30:20 remains biphasic at temperatures up to 190° C., and only become monophasic at temperatures >190° C. This phenomenon allows the method to be tailored for the desired reaction temperature.

TABLE 2

Miscibility of Benzene

| GVL:Benzene:water | Temperature (° C.) | Miscibility |
|---|---|---|
| 80:10:10 | 20 | Miscible, single phase |
| 70:10:20 | 20-140 | Immiscible, two phases |
| 70:10:20 | >140 | Miscible, single phase |
| 60:20:20 | 20-160 | Immiscible, two phases |
| 60:20:20 | >160 | Miscible, single phase |
| 50:30:20 | 20-190 | Immiscible, two phases |
| 50:30:20 | >190 | Miscible, single phase |

Generally speaking, unless cost concerns dominate, the co-solvent should be chosen and optimized so as not to impact negatively the selectivity toward sugar formation from the biomass reactant. This criterion can be demonstrated using the GVL/benzene/water system as an example. By varying the relative concentrations of the GVL solvent, the benzene co-solvent, and water, the product mix and the percentage of the product that ends up in the aqueous phase can be controlled. See Table 3. As shown in the table, the 60:20:20 (GLV:benzene:water) solvent system gives excellent xylose and glucose yields, with 80% of the xylose and 72% of the glucose being recovered in the aqueous phase.

TABLE 3

Comparison of Yields with Various Solvent Systems

| Solvent (GVL:Benzene:Water) | Xylose yield (%) | Glucose yield (%) | $C_5$ Yield (%) | $C_6$ Yield (%) |
|---|---|---|---|---|
| 80:0:20 | 84 | 71 | 95 | 91 |
| 80:10:10 | 61 | 54 | 75 | 86 |
| 70:10:20 | 85 | 75 | 96 | 98 |
| 60:20:20 | 89 (85)[a] | 77 (72)[a] | 94 | 91 |

[a]Data in parenthesis represents the percentage of sugar partitioned into the aqueous phase. This is the fraction of the sugar in the biomass feedstock. For example, if the feedstock contains 100 mmol of glucose, the aqueous phase after separation contains 72 mmol of glucose and the organic phase contains 5 mmol of glucose. The total glucose extracted is 77 mmol.

The second criterion noted earlier is that it is preferred (but not required) that the solvent system yields two separate phases below the reaction temperature: an organic phase rich in GVL and co-solvent and an aqueous phase rich in sugar and water. Tables 4 and 5 present the product analysis for the 60:20:20 (GVL:benzene:water, by weight) solvent system described in Table 3. The reaction conditions were the same as those listed in the examples. As shown in the Tables 4 and 5, the product mix was very strongly partitioned between the two phase, thus greatly simplifying product separation and purification. Under these conditions, the total yield of xylose was about 89%, with only 5% in the organic phase and 85% in the aqueous phase. Similarly, the total yield of glucose was about 77%, with only 5% in the organic phase and 72% in the aqueous phase. Again, note that the two phases form spontaneously, so no additional energy or cost is required to attain this separation.

TABLE 4

Yields Found in Organic Phase
Organic

| Yield (%) | Component | Yield (%) |
|---|---|---|
| 4.8 | Xylose | 0.1 |
| 5.5 | Glucose | 0.1 |
| 2.6 | Levulinic acid | 1.1 |
| 1.2 | Furfural | 2.0 |

TABLE 5

Yields Found in Aqueous Phase
Aqueous

| Yield (%) | Component | Yield (%) |
|---|---|---|
| 80.2 | Xylose | 79.4 |
| 72.1 | Glucose | 78.7 |
| 9.7 | Levulinic acid | 10.6 |
| 3.4 | Furfural | 3.4 |

The third criterion noted earlier is that it is much preferred (but not required) if solvent system renders a substantial portion of any lignin present in the reactant insoluble. If the chosen solvent system partitions, this third criterion yields a third phase: a precipitate comprising lignin. Precipitating at least a portion of the lignin present in the reactant also greatly simplifies post-reaction processing because the insoluble lignin can be removed by straightforward means, such as by precipitation or in a settling tank. Table 6 present representative yields, taken from the reaction described above for Tables 4 and 5. As shown in Table 6, total lignin recovery was 75%, with 44% of the lignin being recovered as a precipitate.

TABLE 6

Representative Lignin Yields

| | |
|---|---|
| Lignin in biomass reactant (16.2 wt %) | 0.405 grams |
| Lignin obtained as precipitate | 0.178 grams |
| Lignin retained in the organic phase | 0.126 grams |
| Total lignin obtained | 0.304 grams |
| % lignin recovery as precipitate | 44% |
| % total lignin recovery | 75% |

Tables 7 and 8 report the results when using toluene as the co-solvent (rather than benzene). In the same fashion as in Table 3, by varying the relative concentrations of the GVL solvent, the toluene co-solvent, and water, the product mix and the percentage of the product that ends up in the aqueous phase can be controlled. See Tables 7 and 8. As shown in Table 7, both the 70:10:20 and 60:20:20 systems (GVL: toluene:water, by weight) are monophasic at temperatures suitable for the reaction, but are biphasic at lower temperatures. Table 8 shows that the 60:20:20 system gives excellent results, with 85% xylose yield (81% in the aqueous phase) and 80% glucose yield (75% in the aqueous phase).

TABLE 7

Miscibility of Toluene

| GVL:Toluene:water | Temperature (° C.) | Miscibility |
|---|---|---|
| 80:10:10 | 20 | Miscible, single phase |
| 70:10:20 | 20-150 | Immiscible, two phases |
| 70:10:20 | >150 | Miscible, single phase |
| 60:20:20 | 20-165 | Immiscible, two phases |
| 60:20:20 | >165 | Miscible, single phase |

TABLE 8

Hydrolysis with Toluene Co-Solvent

| Solvent (GVL:Toluene:water) | Xylose yield (%) | Glucose yield (%) | $C_5$ Yield (%) | $C_6$ Yield (%) |
|---|---|---|---|---|
| 80:0:20 | 84 | 71 | 95 | 91 |
| 60:20:20 | 85 (81) | 80 (75) | 96 | 94 |

<sup>a</sup>Data in parenthesis represents the percentage of sugar partitioned to the aqueous phase. This is the fraction of the sugar in the biomass feedstock. For example, if the feedstock contains 100 mmol of glucose, the aqueous phase after separation contains 75 mmol of glucose and the organic phase contains 5 mmol of glucose. The total glucose extracted is 85 mmol.

An important consideration from an economics standpoint is the ability to remove, recover and recycle the organic solvent. Lactones in general and GVL in particular are relatively expensive solvents. Additionally, lactones are not necessarily compatible with the organisms used in biological upgrading. Thus, if the product mix is to be upgraded or otherwise treated with bacteria, yeast, or other organisms, the residual amount of organic solvent (i.e., lactone) remaining in the aqueous phase might be a concern. For example, most bacteria and yeast will tolerate up to about 2% by weight of GVL in the fermentation medium. But higher concentrations might be detrimental to growth and metabolism of the organism. In Table 9, the product mix from the GVL:benzene:water solvent system described above was extracted three times with benzene, and the residual amount of GVL present in the aqueous phase determined. As can be seen from Table 9, only three extractions were required to drive the concentration of GVL remaining in the aqueous phase to a level below 2 wt %.

TABLE 9

Separation of GVL

| Separation # | GVL (wt %) |
|---|---|
| 1 (biphasic solution from the reactor) | 25 |
| 2 (20% of the overall hydrolysate) | 9.8 |
| 3 (20% of the overall hydrolysate) | 4.3 |
| 4 (20% of the overall hydrolysate) | 1.2 |

In Table 9, total hydrosylate obtained was 75 grams. For extractions 2, 3, and 4, 15 grams of benzene was added. No benzene was added in "Separation #1" because the hydrosylate was biphasic as it exited the reactor. This shows that the aqueous phase can be used, with minimal post-reaction processing, in processes utilizing micro-organisms, such as fermentation and the like.

EXAMPLES

The following examples are included solely to provide a more complete disclosure of the method described and claimed herein. The examples do not limit the claims in any fashion.

Figure 1:
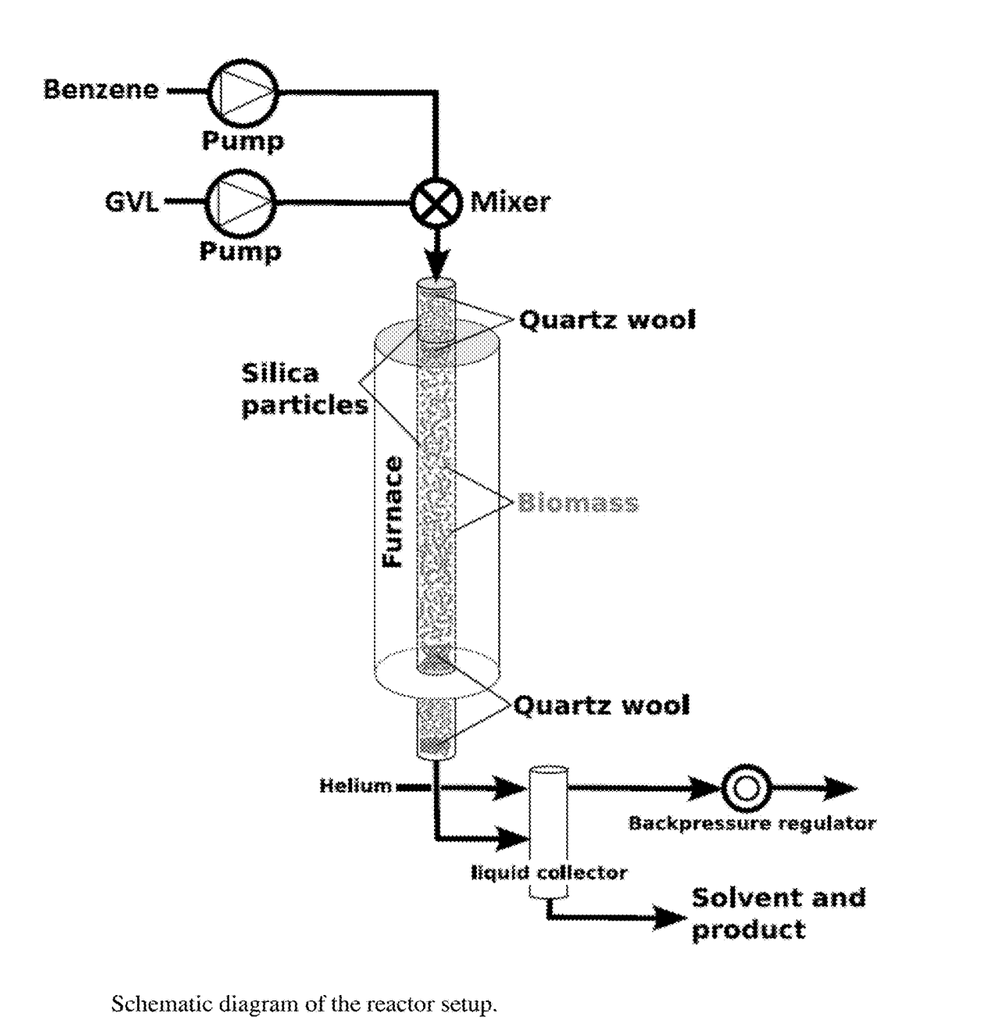

General Procedure:

A schematic representation of the reactor setup used to solubilize and fractionate biomass is shown in FIG. 1. In a typical experiment, 2.5 grams of biomass were mixed with 3.5 grams of fused silica chips to form the reactor bed. The reactor was a metal tube 30 cm in length and 1.27 cm in diameter. The reactor was filled by placing the biomass bed between two beds of silica chips and capped with a plug of quartz wool on either end (see FIG. 1). The reactor was heated to the reaction temperature using an insulated furnace. The reactor was placed in the furnace such that the complete biomass bed was in the heating zone. The temperature of the biomass bed was measured at the reactor wall by a K-type thermocouple. The reactor was pressurized to 300 psi using helium, and the pressure was maintained throughout the reaction by using a back flow regulator (TESCOM Products, a wholly-owned subsidiary of Emerson Process Management Regulator Technologies, Inc., Elk River, Minn., USA). The liquid solvent (e.g., GVL/$H_2O$ mixture and the organic co-solvent) was flowed through the reactor at a specific flow rate using an HPLC pump (series I, Scientific Systems, Inc., State College, Pa., USA).

Biomass conversion was carried out by heating the reactor to 160° C. under flowing helium by linearly increasing the temperature at a rate of approximately 7 K/min. After the reactor temperature reached 160° C., the flow of helium was stopped, and a GVL/$H_2O$ mixture containing 75 wt % GVL, 25 wt % $H_2O$ and 6.25 mM $H_2SO_4$ was flowed at a rate of 1.6 ml/min, along with the organic solvent (benzene or toluene) at a rate of 0.46 ml/min. During this flow-through step, the temperature was increased linearly from 160 to 220° C. in 30 min and then held at 220° C. for an additional 17 minutes before the solvent flow was stopped and the reactor was cooled to room temperature. The liquid hydrolysate was collected in a separator held at 300 psi using a back pressure regulator. The hydrolysate became biphasic as it cooled to room temperature. The hydrosylate comprised an aqueous phase retaining the majority of the sugars and an organic phase retaining the majority of the GVL. These two phases were separated using a separatory funnel and analyzed for carbohydrate concentration and dehydration product concentrations.

Analytical Methods:

The composition of the aqueous phase was analyzed for glucose, xylose, levulinic acid, GVL, HMF and furfural. An aliquot of the aqueous phase was diluted 10 times in water and was analyzed on a Waters HPLC system equipped with an Aminex HPX-87-H column. Glucose, xylose, levulinic acid and GVL were analyzed with an RI detector, while HMF and furfural concentrations were measured with a photodiode array detector at 230 nm. Yields of glucose, levulinic acid and HMF were calculated with respect to the total glucans present in the biomass, and the yields of xylose and furfural were calculated with respect to the total xylans present in the biomass.

The yields of oligomers of glucose and xylose in the hydrolysate were obtained by measuring the monomer concentrations before and after the depolymerization of the oligomers. Oligomers were depolymerized by adding sulfuric acid to the hydrolysate, such that a solution with 0.4 wt % sulfuric acid concentration was obtained. This solution was placed in oil bath at 120° C. for 60 minutes. The oligomer yield was calculated as the difference between the monomer yields before and after depolymerization.

The fraction of the sugars that partitioned into the organic phase was analyzed by taking an aliquot of the organic phase and diluting it 10 times with water. The resulting biphasic mixture was shaken for 1 minute to partition the sugars from the organic phase to the aqueous phase. This aqueous phase was then analyzed by HPLC for the sugar concentrations, as described above.

A fraction of lignin present in the biomass precipitated out of the biphasic solvent mixture (i.e., GVL/H$_2$O mixture and the organic co-solvent) and was collected by centrifugation. Dilution of the aqueous phase (after separation of insoluble lignin and organic phase) with water did not yield any further amount of lignin. In contrast, dilution of the organic phase with water led to precipitation of the lignin soluble in the organic phase. The precipitated lignin was separated by filtration and dried at 40° C. under vacuum for 24 hours.

Results:

The yields of glucose, xylose, HMF, levulinic acid and furfural in the aqueous and the organic phases are shown in Table 10. The total glucose yield obtained from glucans in the biomass was 77%. The amount of glucose in the aqueous phase corresponds to a glucose yield of 72% (based on glucans in the original amount of biomass), and the amount of glucose in the organic phase corresponds to a glucose yield of 5.5%. The amount of xylose in the aqueous phase corresponds to a xylose yield of 80% (based on xylans in the original amount of biomass), and the amount of xylose in the organic phase corresponds to a xylose yield of 5%.

TABLE 10

Carbohydrate and dehydrated product yields

| Component | Oligomer Yield Aqueous phase | Monomer Yield | |
|---|---|---|---|
| | | Aqueous phase | Organic phase |
| Xylose | 52.3 | 80.1 | 4.8 |
| Furfural | 2.1 | 3.4 | 1.2 |
| Glucose | 23.3 | 72.1 | 5.5 |

TABLE 10-continued

Carbohydrate and dehydrated product yields

| Component | Oligomer Yield Aqueous phase | Monomer Yield | |
|---|---|---|---|
| | | Aqueous phase | Organic phase |
| Levulinic acid | 6.3 | 9.7 | 2.6 |
| HMF | 0.7 | 0.5 | 0.3 |

The amount of lignin that precipitated from the biphasic solvent mixture (i.e., GVL/H$_2$O mixture and the organic co-solvent) corresponded to a lignin yield of 44% (based on lignin in the original amount of biomass), as shown in Table 11. Additional lignin present in the organic phase was precipitated by dilution with water followed by filtration, leading to a lignin yield of 31% (Table 6).

What is claimed is:

1. A method to produce an aqueous solution of carbohydrates comprising C6-sugar-containing oligomers, C6-sugar monomers, C5-sugar-containing oligomers, C5-sugar monomers, or any combination thereof, the process comprising:
   reacting biomass or a biomass-derived reactant comprising lignin with a solvent system comprising
      (i) an organic solvent selected from the group consisting of polar aprotic solvents,
      (ii) an organic co-solvent, and
      (iii) water;
   in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof, and
   at least 10% of the lignin present in the biomass or biomass-derived reactant is present in the product mixture as a precipitate.

2. The method of claim 1, wherein the organic solvent is miscible with water at ambient temperature.

3. The method of claim 1, wherein the organic solvent is a polar aprotic solvent selected from the group consisting of cyclic ethers, beta-, gamma-, and delta-lactones, and combinations thereof.

4. The method of claim 1, wherein the organic solvent is gamma-valerolactone (GVL).

5. The method of claim 1, wherein the organic solvent is present in a mass ratio with the water (organic solvent:water ratio) ranging from about 60:40 to about 99:1.

6. The method of claim 1, wherein the acid is homogeneous or heterogeneous, and if the acid is homogeneous it is present in a concentration not greater than 100 mM based on volume of the solvent system, and if the acid is heterogeneous it is present in a concentration not greater than 1.0 wt % based on weight of the solvent system.

7. The method of claim 6, wherein the acid is a mineral acid or an organic acid.

8. The method of claim 6, wherein the acid is a solid acid selected from the group consisting of a solid Brønsted acid, a solid Lewis acid catalysts, and combinations thereof.

9. The method of claim 1, wherein the biomass or a biomass-derived reactant is reacted at a temperature range from about 100° C. to about 300° C.

10. The method of claim 1, wherein the biomass or a biomass-derived reactant is reacted at a dynamic temperature range.

11. The method of claim 10, wherein the dynamic temperature range ramps from a first temperature to a second temperature that is higher than the first temperature.

12. The method of claim 10, wherein the dynamic temperature range changes from a first temperature to a second temperature in a linear fashion or a non-linear fashion.

13. The method of claim 1, wherein the biomass or a biomass-derived reactant comprises water-insoluble glucose-containing polymers or oligomers, or water-insoluble xylose-containing polymers or oligomers, or any combination thereof, and these, if present, are converted to water-soluble glucose-containing oligomers, glucose monomers, water-soluble xylose-containing oligomers, xylose monomers, or any combination thereof.

14. The method of claim 1, wherein in step (a), residence time of the reaction ranges from 1 min to 24 hours.

15. A method to produce an aqueous solution of carbohydrates comprising C6-sugar-containing oligomers, C6-sugar monomers, C5-sugar-containing oligomers, C5-sugar monomers, or any combination thereof, the process comprising:
reacting biomass or a biomass-derived reactant with a solvent system comprising:
(i) an organic solvent selected from the group consisting of polar aprotic solvents,
(ii) an organic co-solvent, wherein the organic co-solvent is selected from the group consisting of linear, branched or cyclic alkanes; linear, branched or cyclic alkenes; linear, branched or cyclic ketones; linear, branched or cyclic alcohols; aromatic hydrocarbons; and substituted or unsubstituted phenols, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof; and
at least 10% of lignin, if present in the biomass or biomass-derived reactant, is present in the product mixture as a precipitate.

16. A method to produce an aqueous solution of carbohydrates comprising C6-sugar-containing oligomers, C6-sugar monomers, C5-sugar-containing oligomers, C5-sugar monomers, or any combination thereof, the process comprising:
reacting biomass or a biomass-derived reactant with a solvent system comprising:
(i) an organic solvent, wherein the organic solvent is gamma-valerolactone (GVL),
(ii) an organic co-solvent which is an aromatic hydrocarbon, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof; and
at least 10% of lignin, if present in the biomass or biomass-derived reactant, is present in the product mixture as a precipitate.

17. A method to produce an aqueous solution of carbohydrates comprising C6-sugar-containing oligomers, C6-sugar monomers, C5-sugar-containing oligomers, C5-sugar monomers, or any combination thereof, the process comprising:
reacting biomass or a biomass-derived reactant with a solvent system comprising:
(i) an organic solvent selected from the group consisting of polar aprotic solvents,
(ii) an organic co-solvent, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof; and
at least 10% of lignin, if present in the biomass or biomass-derived reactant, is present in the product mixture as a precipitate;
wherein the organic co-solvent is present in a volume ratio with the solvent system (organic co-solvent:solvent ratio) ranging from about 5:50 to about 10:30.

18. A method to produce an aqueous solution of carbohydrates comprising C6-sugar-containing oligomers, C6-sugar monomers, C5-sugar-containing oligomers, C5-sugar monomers, or any combination thereof, the process comprising:
reacting biomass or a biomass-derived reactant with a solvent system comprising:
(i) an organic solvent selected from the group consisting of polar aprotic solvents,
(ii) an organic co-solvent, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof;
wherein the solvent system is monophasic at the temperature of the reaction and biphasic at a lower temperature; and
at least 10% of lignin, if present in the biomass or biomass-derived reactant, is present in the product mixture as a precipitate.

19. A method to produce an aqueous solution of carbohydrates comprising C6-sugar-containing oligomers, C6-sugar monomers, C5-sugar-containing oligomers, C5-sugar monomers, or any combination thereof, the process comprising:
reacting biomass or a biomass-derived reactant with a solvent system comprising
(i) an organic solvent selected from the group consisting of polar aprotic solvents, (ii) an organic co-solvent, and
(iii) water;
in the presence of an acid, for a time, at a pressure, and at a temperature to yield a product mixture wherein at least a portion of water-insoluble C6-sugar-containing polymers or oligomers, or water-insoluble C5-sugar-containing polymers or oligomers, if present in the biomass or biomass-derived reactant, are converted to water-soluble C6-sugar-containing oligomers, C6-sugar monomers, C5-sugar-containing oligomers, C5-sugar monomers, or any combination thereof, and wherein the solvent system is monophasic at the temperature of the reaction and biphasic at a lower temperature.

20. The method of claim 19, wherein the solvent system is monophasic at a temperature range of about 100° C. to about 300° C., and is biphasic at temperatures below about 50° C.

21. The method of claim 19, wherein at least 10% of lignin, if present in the biomass or biomass-derived reactant, is present in the product mixture as a precipitate.

22. The method of claim 19, wherein the organic solvent is miscible with water at ambient temperature.

23. The method of claim 19, wherein the organic solvent is a polar aprotic solvent selected from the group consisting of cyclic ethers, beta-, gamma-, and delta-lactones, and combinations thereof.

24. The method of claim 19, wherein the organic solvent is gamma-valerolactone (GVL).

25. The method of claim 19, wherein the organic co-solvent is selected from the group consisting of linear, branched or cyclic alkanes; linear, branched or cyclic alkenes; linear, branched or cyclic ketones; linear, branched or cyclic alcohols; aromatic hydrocarbons; and substituted or unsubstituted phenols.

26. The method of claim 19, wherein the organic solvent is gamma-valerolactone (GVL) and the organic co-solvent is an aromatic hydrocarbon.

27. The method of claim 19, wherein the organic solvent is present in a mass ratio with the water (organic solvent:water ratio) ranging from about 60:40 to about 99:1.

28. The method of claim 19, wherein the organic co-solvent is present in a volume ratio with the solvent system (organic co-solvent:solvent ratio) ranging from about 5:50 to about 10:30.

29. The method of claim 19, wherein the acid is homogeneous or heterogeneous, and if the acid is homogeneous it is present in a concentration not greater than 100 mM based on volume of the solvent system, and if the acid is heterogeneous it is present in a concentration not greater than 1.0 wt % based on weight of the solvent system.

30. The method of claim 29, wherein the acid is a mineral acid or an organic acid.

31. The method of claim 29, wherein the acid is a solid acid selected from the group consisting of a solid Brønsted acid, a solid Lewis acid catalysts, and combinations thereof.

* * * * *